United States Patent
Antonakakis et al.

(10) Patent No.: US 9,871,771 B2
(45) Date of Patent: Jan. 16, 2018

(54) CRYPTOGRAPHIC SECURITY PROFILES

(71) Applicants: Stavros Antonakakis, Lake Mary, FL (US); Bradley William Corrion, Chandler, AZ (US)

(72) Inventors: Stavros Antonakakis, Lake Mary, FL (US); Bradley William Corrion, Chandler, AZ (US)

(73) Assignee: NCR Corporation, Duluth, GA (US)

( * ) Notice: Subject to any disclaimer, the term of this patent is extended or adjusted under 35 U.S.C. 154(b) by 33 days.

(21) Appl. No.: 14/553,351

(22) Filed: Nov. 25, 2014

(65) Prior Publication Data

US 2016/0149865 A1 May 26, 2016

(51) Int. Cl.
*G06F 21/82* (2013.01)
*H04L 29/06* (2006.01)
(Continued)

(52) U.S. Cl.
CPC ......... *H04L 63/0428* (2013.01); *G06F 21/71* (2013.01); *G06F 21/82* (2013.01);
(Continued)

(58) Field of Classification Search
CPC . H04L 63/0428; H04L 63/20; H04L 63/0869; H04L 67/14; H04L 67/146; H04L 9/083; H04L 9/0838; H04L 9/321; H04L 9/3273; H04L 29/06; H04L 41/0806; H04L 63/04; H04L 63/0492; H04L 63/10; H04L 63/1416; H04L 63/168; H04L 63/205; H04L 67/141; H04L 63/00; H04L 51/32; H04L 63/0421; H04L 67/306;
(Continued)

(56) References Cited

U.S. PATENT DOCUMENTS

2009/0025080 A1* 1/2009 Lund .................... H04L 9/3273
726/15
2012/0254982 A1* 10/2012 Sallam .................. G06F 21/566
726/16
(Continued)

FOREIGN PATENT DOCUMENTS

EP 2007110 12/2008
WO 0030292 A1 5/2000

OTHER PUBLICATIONS

Dierks Independent E Rescorla RTFM T et al: "The Transport Layer Security (TLS) Protocol Version 1.2; rfc5246.txt" The Transport Layer Security (TLS) Protocol Version 1.2; RFC5246.TXT, Internet Engineering Task Force, IETF; Standard, Internet Society (ISOC) 4, Rue Des Falaises CH-1205 Geneva, Switzerland. Aug. 1, 2008 (Aug. 1, 2008), XP015060256, Sections 7 and 8.
(Continued)

*Primary Examiner* — Kambiz Zand
*Assistant Examiner* — Abiy Getachew
(74) *Attorney, Agent, or Firm* — Schwegman, Lundberg & Woessner

(57) ABSTRACT

Two endpoint devices communicate with one another in a secure session by negotiating encrypted communications at initial establishment of the session. Each endpoint device communicates its available security profiles to the other endpoint. A specific security profile is then selected that defines the data encryption and authentication used during the secure session between the two endpoint devices.

14 Claims, 6 Drawing Sheets

(51) Int. Cl.
*G06F 21/71* (2013.01)
*G06F 21/85* (2013.01)

(52) U.S. Cl.
CPC .............. *G06F 21/85* (2013.01); *H04L 63/20* (2013.01); *H04L 63/205* (2013.01)

(58) Field of Classification Search
CPC ....... G11B 20/00086; H04N 21/26613; H04N 21/4135; H04N 21/43632; G06F 21/55; G06F 21/554; G06F 19/322; G06F 21/6254; G06F 21/71; G06F 21/82; G06F 21/85; G06Q 10/10; G06Q 30/02; G06Q 50/01
USPC .......................................................... 713/168
See application file for complete search history.

(56) References Cited

U.S. PATENT DOCUMENTS

2013/0268357 A1* 10/2013 Heath .................... H04L 63/00
 705/14.53
2014/0254434 A1* 9/2014 Jain ....................... H04L 67/306
 370/259

OTHER PUBLICATIONS

European Seach Report dated Mar. 29, 2016 in co-pending European Patent Application 15191173.2.

\* cited by examiner

CRYPTOGRAPHIC SECURITY PROFILES

BACKGROUND

Online or electronic security is a major issue in the industry. It seems a month does not go by without news of some major business having a security breach. Such breaches include government agencies, retail outlets, social media companies, and even major banks.

Whenever an enterprise believes that a secure fix to remedy a breach has been deployed, hackers quickly figure out a new way to breach their systems. In some cases, the breaches are not even within the systems of the enterprise; rather, the breaches can occur over network transmission lines that enter or exit the enterprise systems; the hackers use sniffing techniques to acquire copies of data packets being transmitted over the network lines and find a way to break any encryption being used (assuming encryption was being used).

Cryptographic systems are in a continuous state of change. While cryptographic techniques and concepts may not vary all that much over time—algorithms, key types and key sizes do frequently change to keep up with improvements in computing power and cryptographic research that yields practical attacks possible for mainstream algorithms.

To clarify this point, cryptographic techniques and concepts such as: Diffie-Hellman key exchange, Public Key Infrastructure, hashing, signing/verifying, encrypting/decrypting and chaining have been around for a long time and continue to be first class citizens of cryptography. However, just looking at the hashing functions, one notices that over the past few decades the industry has progressively improved hashing algorithms, such as: Message Digests (MD2, MD4, MD5, RIPEMD (RACE Integrity Evaluation Message Digest)) and Secure Hash Algorithms (SHA-0, SHA-1, SHA-2 (SHA-224/256/384/512) and now SHA-3). Similarly in symmetric encryption the industry has experienced a steady progression in algorithmic improvements, such as: DES (Date Encryption Standard), Rivest Ciphers (RC2 and RC), Triple DES (3DES), Twofish (a symmetric key block cipher), and Advanced Encryption Standard (AES). In the asymmetric encryption space improvements have been made to such things as: Pretty Good Privacy (PGP), Rivest-Shamir-Adleman (RSA) and Elliptic Curve Cryptography (ECC) to name just a few.

But, updating internal systems to accommodate improved algorithms, key types, and key sizes are expensive manually-intensive efforts for an enterprise often requiring updates to devices and software throughout the enterprise.

Therefore, there is a need for improving cryptographic deployments within an enterprise.

SUMMARY

In various embodiments, techniques for communicating with cryptographic security profiles are presented. According to an embodiment, a method for communicating with a cryptographic security profile is provided.

Specifically, a security profile list is received from a requesting device. Next, a security profile is selected from the security profile list. Finally, a secure communication session is established with the requesting device using the selected security profile for data encryption during the secure communication session.

DETAILED DESCRIPTION

Figure 1A:
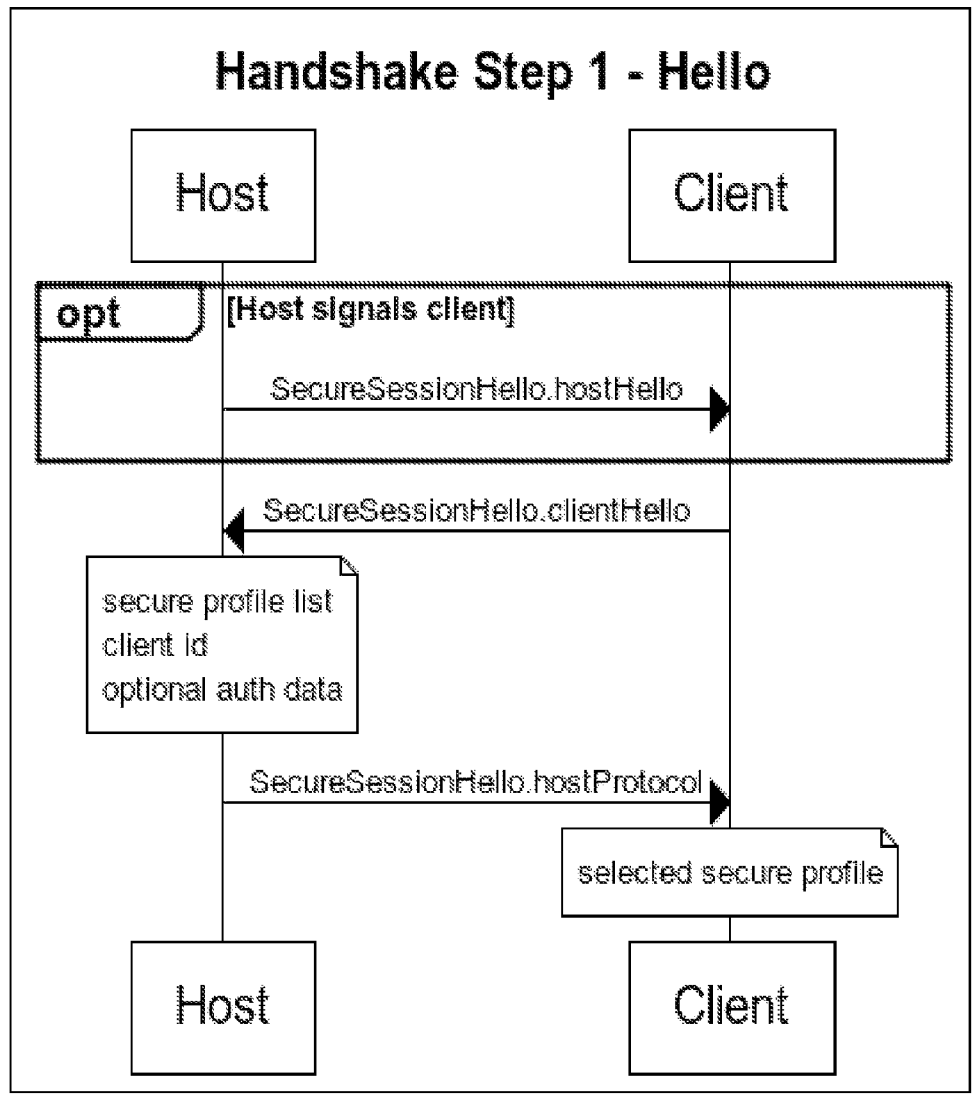
FIGS. 1A, 1B, and 1C are diagrams of an initial handshake for establishing a communication session that communicates using a cryptographic security profile, according to an example embodiment.
Figure 1B:
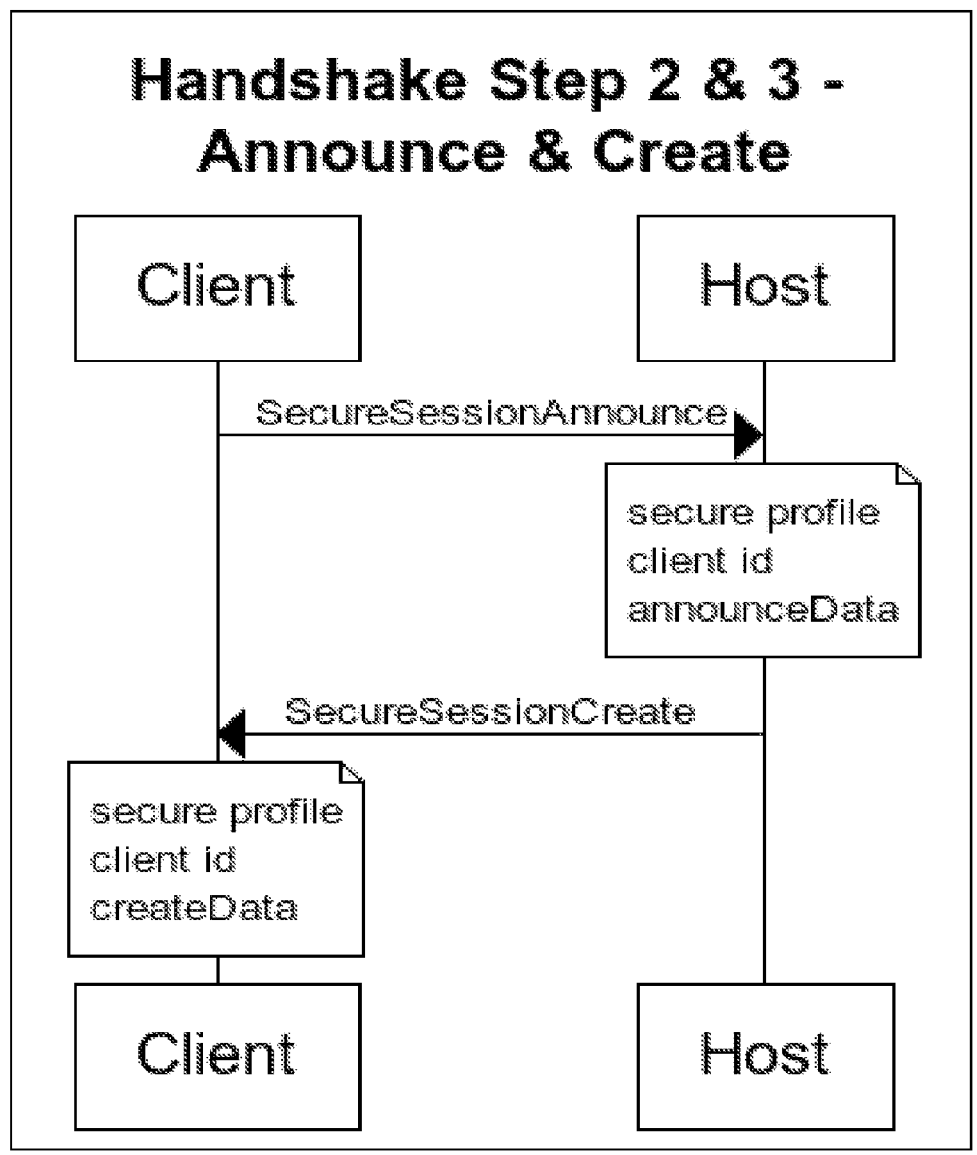
Figure 1C:
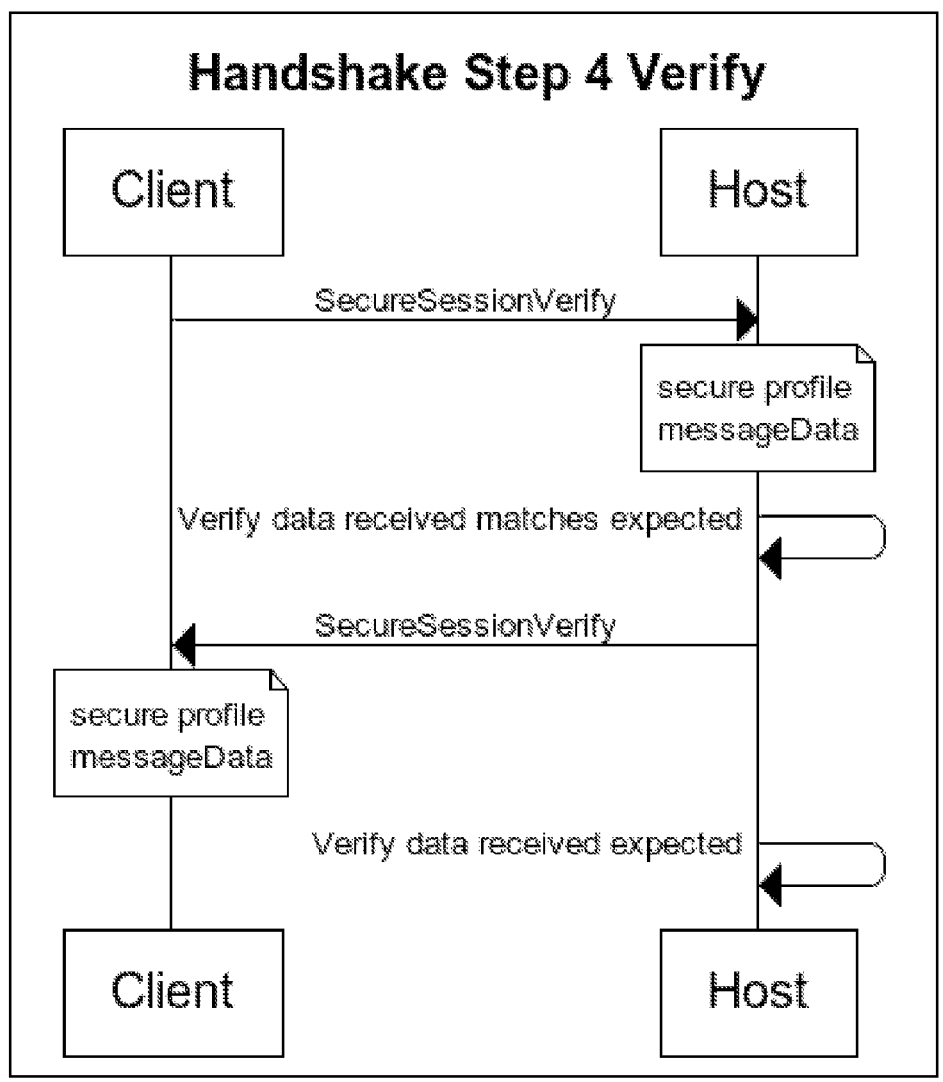

FIGS. 1A, 1B, and 1C are diagrams of an initial handshake for establishing a communication session that communicates using a cryptographic security profile, according to an example embodiment. The components of the diagram are shown in greatly simplified form with only those components shown necessary for the understanding of the some embodiments of the invention.

The diagram includes an enterprise host device and a client device illustrating processing to initially establish a communication session between the host device and the client device and identifying a security profile to use during the session. The host device and client device are considered endpoints that establish secure communication sessions with one another. An endpoint can be a Secure Input/Output Module (SIOM) or a peripheral device (such as: a printer, a scanner, a pin pad, an encrypted pin pad, a Magnetic Strip Reader (MSR), a display, a keyboard, a value-media dispenser, a touch-screen display, and the like).

A SIOM is an independent hardware module that is integrated into a terminal device. The SIOM is independent of the terminal device's Operating System (OS) and acts as an interface for communications to an from the peripheral devices (which are also integrated into the terminal device.

The terminal device can be a Point-Of-Sale (POS) device, an Automated Teller Machine (ATM), a kiosk, a Self-Service Terminal (SST), and the like.

Communications to and from the peripheral devices occur via secure (encrypted) sessions between the SIOM and the peripheral devices that the SIOM acts as an interface for (can be one peripheral or many peripherals).

As used herein "security protocol" refers to the encryption used between two endpoint devices during a secure session. The transport protocol over the wire or bus connections can remain unchanged, but the data payload encryption occurs via the custom encryption and is referred to herein as the security profile between the endpoints.

All encryption and decryption (cryptographic algorithms, keys, and key sizes) that can be used between two endpoints are moved to a security profile. This allows for new secure profiles to be defined at later points in time and dynamically added without changing the processing logic of the two endpoints as new security attacks are discovered and stronger algorithms become necessary. This provides for adapted and dynamic responses in much quicker response times than what has been heretofore available in the industry.

So, the secure session protocol is enhanced to add security profile negotiation in the initial handshake between two endpoints (host and client in the FIG. 1A) where the host endpoint evaluates the commonly supported security profiles on its end (available to the host) and on the client's end (available to the client) and then the host selects the strongest profile to be used for the secure session being established between the host and the client. This allows for heterogeneous deployment of older and newer peripherals supporting different security profiles and ensures that the strongest mutually available security profiles are used during any secure session between endpoints.

These security profiles can be defined and published in the industry to ensure quality control over what suites of profiles are created and implemented in the field and maintains control over compliance with the suites published.

For example, a secure peripheral manufacturer can choose to implement support for more than one security profile. This also improves the interoperability with prior generation devices and peripherals.

The secure session protocol incorporates a security profile capability discover sequence that occurs prior to establishing a secure session between two endpoints.

In the FIG. 1A, the client may be viewed as a peripheral during the pairing and provides a list of security profiles that it supports during the initial handshake to the host (such as a SIOM). The host endpoint (typically the SIOM) selects the strongest security profile supported by both the host and the client, and the host responds back with the security profile that is to be used for the secure session. The client (peripheral) makes the security profile it selected active and proceeds to establish the secure session between the host (SIOM) and the client (peripheral) (FIGS. 1B and 1C). All communication for that secure session proceeds from that point on during the secure session using the selected security profile, which cannot be changed.

Referring now to the FIG. 1A, once again, either endpoint can tripper the pairing handshake although it is more likely that the client (peripheral) initiates the initial conversation. A successful "Hello" message is required for a mutually support secure session security profile to be supported between the client and the host. The host selects and confirms a security profile that will be used for the remainder of the handshake communications. The secure protocol supports an authentication algorithm to verify the client, although this authentication mode is not required.

FIGS. 1B and 1C are diagrams of that illustrate using the cryptographic security profile chosen in the FIG. 1A in establishing the secure session, according to an example embodiment.

With the security profile selection established (from the FIG. 1A processing), the client assembles and sends announcement data, which confirms the security profile along with the client's identifier. The host creates its session state and provides an encrypted payload of data for the client to create its end. A successful announcement and create event requires the mutually supported secure session security profile to be confirmed with the client identifier and session key to be known to the host and the client to have its embedded encryption key for use, finally verifying the established secure session through the mutual sharing of a known message to either side: if the endpoint successfully decrypts and authenticates the expected message, then the secure session is verified to have been correctly setup.

In an embodiment, the security profile may impose additional client and/or host endpoint cryptographic element requirements that are to be met for a successful announce, create, and verify.

As demonstrated above and more completely below, the techniques here provide for improved cryptographic flexibility and adaptive responsiveness to security threats in an enterprise environment.

For example, the techniques provide for cryptographic agility, which is the ability to replace cryptographic elements of a solution or a protocol without violating any design specification and without having to re-engineer the solution. The technique provides a low friction path to the unavoidable need to strengthen a cryptographic system's elements over time as base algorithms are compromised by newly found attacks and the availability of more powerful computers make previously found impractical attacks on algorithms more practical. With the techniques herein, provide cryptographic agility by at least allowing a dynamic swap of a hash, symmetric, or PKI algorithms and their keys for new algorithms and keys.

The techniques also provide a cryptographic agile design by separating out the specific hashing, symmetric, asymmetric, and chaining algorithms and their key sizes from the secure protocol definitions and binding them to a specific version of the protocol and specification using a specific security profile. Moreover, the protocol specification allows for the definition of a specific combination of algorithms and key sizes and binds them to a set. The set is called the secure session security profile.

The secure session security profile is a combination of specific hashing, asymmetric, symmetric, chaining algorithms and key sizes that define an implementation of the protocol. Every published revision of the secure session security protocol specification will include a concrete set of supported security profiles. The security profiles do not have a backward or forward compatibility requirement; however, an endpoint can readily support more than one published security profile type allowing it to interoperate with more endpoint types.

For two endpoints to be compatible for pairing they need to mutually support at least one security profile. If, during the handshake, the host endpoint identifies multiple mutually supported secure session security profiles, the host is responsible for selecting the most secure candidate.

In an embodiment, the Object Identifier (OID) values can be used to order the strength of the algorithm. For example if the following profiles are found, V2-EnhancedAuthProfile should be selected by the host endpoint because it has a higher OID number or because its version is higher version. The latter two criteria should never conflict:

V1-BasicProfile 1.3.6.1.4.1.191.1.23.1.1.1.2
V2-EnhancedAuthProfile 1.3.6.1.4.1.191.1.23.1.1.1.3

If a profile is created that's stronger than V1-BasicProfile but weaker than V2-EnhancedAuthProfile, the OID can look be: 1.3.6.1.4.1.191.1.23.1.1.1.2.1. Looking at them together we can see that OID order and strength is preserved:

| V1-BasicProfile | 1.3.6.1.4.1.191.1.23.1.1.1.2 |
| V1-AltBasicProfile | 1.3.6.1.4.1.191.1.23.1.1.1.2.1 |
| V2-EnhancedAuthProfile | 1.3.6.1.4.1.191.1.23.1.1.1.3 |

In an embodiment, the secure session protocol (using security profiles) is written in ASN.1 notation and initially includes three predefined security profiles. A sample implementation of this secure session protocol is as follows:

```
/*
/* Information Object Set: The Secure Session Profiles
----------------------------------------------------
The following info object defines the data types, cryptographic
elements & algorithms along with any other characteristics necessary
for defining a concrete secure session security profile. This
specification also defines the concrete security profiles to be
supported. Every supported concrete profile is included in this
specification (for this sample embodiment) and will define the exact
data types, cryptographic elements & algorithms it supports.
*/
SECURESESSIONPROFILE ::= CLASS {
    &profile Profile UNIQUE,-- enforce uniqueness for constructed type
    --open type-- &ClientAnnounceData,    -- client to host pairing portion
    --open type-- &HostCreateData,        -- host to client pairing portion
    --open type-- &MessageData,           -- encrypted payload for transfer
    &symmetricAlgorithm       SymmetricAlgorithmType,
    &asymmetricAlgorithm      AsymmetricAlgorithmType,
    &hashAlgorithm            HashAlgorithmType
} WITH SYNTAX {
    PROFILE                   &profile,
    CLIENTANNOUNCEDATA        &ClientAnnounceData,
    HOSTCREATEDATA            &HostCreateData,
    MESSAGEDATA               &MessageData,
    SYMMETRICALGORITHM        &symmetricAlgorithm,
    ASYMMETRICALGORITHM       &asymmetricAlgorithm,
    HASHALGORITHM             &hashAlgorithm
}
...
/*
    Protocol Zero definition
/*
v0-noAsnProfile SECURESESSIONPROFILE ::= {
    PROFILE     {
        oid     id-v0-noasn,
        name    "V0-NoAsnProfile"
    },
    CLIENTANNOUNCEDATA        NULL,
    HOSTCREATEDATA            NULL,
    MESSAGEDATA               NULL,
    SYMMETRICALGORITHM        aes256cbc,
    ASYMMETRICALGORITHM       rsa2048oaep,
    HASHALGORITHM             sha256ss1
}
v1-basicProfile SECURESESSIONPROFILE ::= {
    PROFILE     {
        oid     id-v1-basic,
        name    "V1-BasicProfile"
    },
    CLIENTANNOUNCEDATA        SEQUENCE {
                              clientNonce OCTET STRING (SIZE(64))
                              },
    HOSTCREATEDATA            SEQUENCE {
                              es OCTET STRING (SIZE(256)),
                              em OCTET STRING (SIZE(64))
                              },
    MESSAGEDATA               SEQUENCE {
                              counter        INTEGER (1..MAX),
                              cipher         OCTET STRING
(SIZE(1..MAX)),
                              authAlg
    AuthenticationAlgorithmType (hmacSha256-24byte),
                              authData     OCTET STRING (SIZE(24))
                              },
    SYMMETRICALGORITHM        aes256cbc,
    ASYMMETRICALGORITHM       rsa2048oaep,
    HASHALGORITHM             sha256ss1
}
v2-enhancedAuthProfile SECURESESSIONPROFILE ::= {
    PROFILE     {
        oid     id-v2-enh-auth,
        name    "V2-EnhancedAuthProfile"
    },
    CLIENTANNOUNCEDATA        SEQUENCE {
                              clientNonce   OCTET STRING (SIZE(64)),
                    authAlg AuthenticationAlgorithmType (rsa256Sha1),
                              authData     OCTET STRING (SIZE(256))
                              },
    HOSTCREATEDATA            SEQUENCE {
                              es     OCTET STRING (SIZE(256)),
                              em     OCTET STRING (SIZE(64))
```

-continued

```
                        },
MESSAGEDATA             SEQUENCE {
        Counter INTEGER (1..MAX),
        cipher          OCTET STRING (SIZE(1..MAX)),
        authAlg         AuthenticationAlgorithmType (hmacSha256),
        authData        OCTET STRING (SIZE(32))
                        },
SYMMETRICALGORITHM          aes256cbc,
ASYMMETRICALGORITHM         rsa2048pkcs1,
HASHALGORITHM               sha256d
}
```

Every secure profile has a globally unique identifier and name using the OID system.

```
Id OBJECT IDENTIFIER ::= {iso(1) identified-organization(3)
    dod(6) internet(1) private(4) enterprise(1) ncr(191)}
    id-prod         OBJECT IDENTIFIER ::= {id     products(1)}
    id-security     OBJECT IDENTIFIER ::= {id-prod        security(23)}
    id-proto        OBJECT IDENTIFIER ::= {id-security    protocols(1)}
    id-ss           OBJECT IDENTIFIER ::= {id-proto       secure-
session(1)}
    id-ss-prof      OBJECT IDENTIFIER ::= {id-ss          profiles(1)}
            -- Secure profile Identifiers
    id-v0-noasn     OBJECT IDENTIFIER ::= {id-ss-prof v0-noasn(1) } --
1.3.6.1.4.1.191.1.23.1.1.1.1
    id-v1-basic     OBJECT IDENTIFIER ::= {id-ss-prof     v1-basic(2)} -
- 1.3.6.1.4.1.191.1.23.1.1.1.2
    id-v2-enh-auth       OBJECT IDENTIFIER ::= {id-ss-prof   v2-enh-
auth(3)} -- 1.3.6.1.4.1.191.1.23.1.1.1.3
```

The above-discussed embodiments and other embodiments are now discussed with reference to the FIGS. 2-4.

Figure 2:
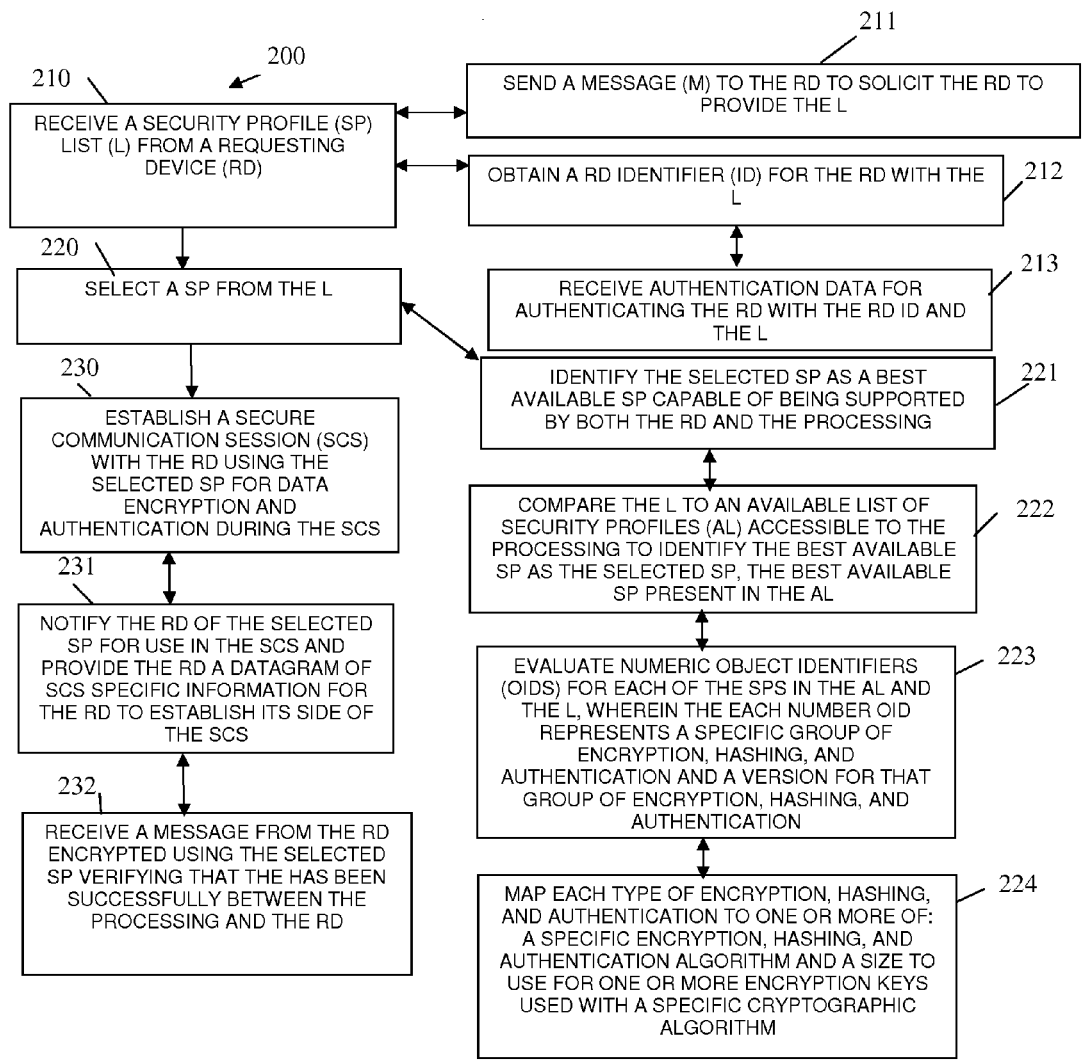
FIG. 2 is a diagram of a method for establishing secure communication between a host device and a receiving device using a cryptographic security profile, according to an example embodiment.

FIG. 2 is a diagram of a method 200 for communicating with a cryptographic security profile, according to an example embodiment. The method 200 (hereinafter "secure session manager") is implemented as instructions programmed and residing in memory or on a non-transitory computer-readable (processor-readable) storage medium and executed by one or more processors of a device. The processors are specifically configured and programmed to process the secure session manager. The secure session manager may also operate over one or more networks. The networks are wired, wireless, or a combination of wired and wireless.

In an embodiment, the secure session manager is the host device of the FIGS. 1A and 1B.

In an embodiment, the secure session manager is a SIOM as described above with the FIGS. 1A and 1B.

The secure session manager is presented from the processing perspective of the device that establishes a secure session with another device.

At 210, the secure session manager receives a security profile list from a requesting device. The security profile list is a list of security profiles that the requesting device can support as discussed above with the FIGS. 1A and 1B.

According to an embodiment, at 211, the secure session manager sends a message to the requesting device to solicit the requested device to provide the security profile list back to the secure session manager.

In an embodiment, at 212, the secure session manager obtains a requesting device identifier for the requesting device with the security profile list.

In an embodiment of 212 and at 213, the secure session manager receives authentication data for authenticating the requesting device with the requesting device identifier and the security profile list.

At 220, the secure session manager selects a security profile from the security profile list. The highest level of security that both the secure session manager and the requesting device are both capable of using to communicate with one another is selected by the secure session manager.

According to an embodiment, at 221, the secure session manager identifies the selected security profile as a best available security profile capable of being supported by both the requesting device and the secure session manager. In this case, best is the one with the highest level of security grade or determination.

In an embodiment of 221 and at 222, the secure session manager compares the list to an available list of security profiles accessible to the secure session manager to identify the best available security profile as the selected profile where the best available security profile present in the available list of security profiles accessible to the secure session manager.

In an embodiment of 222 and at 223, the secure session manager evaluates numeric object identifiers for each of the security profiles in the available list and in the security profile list. Each numeric object identifier represents a specific group or grouping of encryption, hashing, and authentication and a version for that grouping of encryption, hashing, and authentication.

In an embodiment of 223 and at 224, the secure session manager maps each type of encryption, hashing, and authentication to one or more of: a specific encryption, hashing, and authentication algorithm and a size to use for one or more encryption keys used with a specific cryptographic algorithm.

At 230, the secure session manager establishes a secure communication session with the requesting device using the selected security profile for data encryption and authentication during the secure communication session. That is, the data payload is encrypted and authenticated in the secure communication session using the encryption and authentication algorithm, keys, and key sizes defined in the selected security profile.

According to an embodiment, at 231, the secure session manager notifies the requesting device of the selected security profile for using in the secure communication session and provides the requesting device a datagram of secure communication session specific information for the requesting device to establish its side of the secure communication session.

In an embodiment of 231 and at 232, the secure session manager receives a message from the requesting device encrypted using the selected security profile verifying the secure session has been successfully established between the secure session manager and the requesting device.

Figure 3:
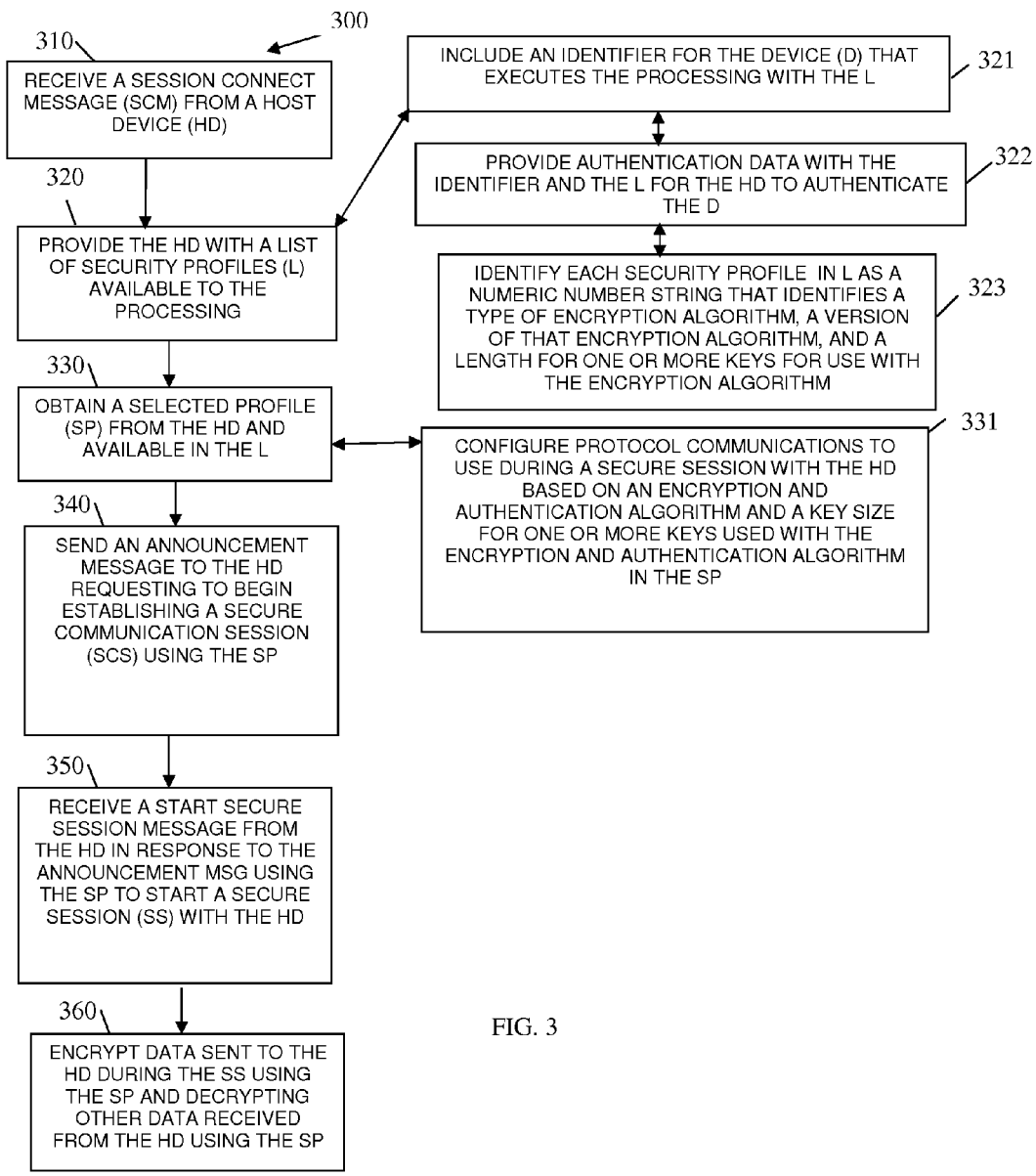
FIG. 3 is a diagram of another method for communicating with a cryptographic security profile, according to an example embodiment.

FIG. 3 is a diagram of another method 300 for communicating with a cryptographic security profile, according to an example embodiment. The method 300 (hereinafter "secure session controller") is implemented as instructions and programmed within memory or a non-transitory computer-readable (processor-readable) storage medium that executes on one or more processors of a device; the processors of the device are specifically configured to execute the secure session controller. The secure session controller is also operational over one or more networks; the networks may be wired, wireless, or a combination of wired and wireless.

The secure session controller is presented from the perspective of the device that supplies a list of security profiles for selection by a host device, the host device establishing the secure session.

In an embodiment, the secure session controller is a peripheral device as discussed above in the FIGS. 1A, 1B, and 1C.

At 310, the secure session controller receives a session connect message from a host device, such as the host device described above with respect to the FIGS. 1A, 1B, and 2.

At 320, the secure session controller provides the host device with a list of security profiles available to the secure session controller for use during a secure communication session with the host device.

According to an embodiment, at 321, the secure session controller includes an identifier for the device that executes the secure session controller with the list of security profiles.

In an embodiment of 321 and at 322, the secure session controller provides authentication data with the identifier and the list of security profiles for the host device to authenticate the device.

In an embodiment of 322 and at 323, the secure session controller identify each security profile in the list of security profiles as a numeric number string that identifies a type of encryption algorithm, a version of that encryption algorithm, and a length for one or more keys for use with the encryption algorithm.

At 330, the secure session controller obtains a selected profile from the host device and available to the secure session controller in the list of security profiles. The selected profile is provided in response to the secure session controller providing the list of security profiles at 320.

In an embodiment, at 331, the secure session controller configures protocol communications to use during a secure session with the host device based on an encrypted and authentication algorithm and a key size for one or more keys used with the encryption and authentication algorithm in the selected profile.

At 340, the secure session controller sends an announcement message to the host device requesting to begin establishing a secure communication session using the selected profile that was supplied by the host device at 330.

According to an embodiment, at 350, the secure session controller receives a start secure session message from the host device in response to the sent announcement message to start a secure session with the host device.

In an embodiment of 350 and at 360, the secure session controller encrypts data sent to the host device during the secure session using the selected profile and the secure session controller also decrypts other data received from the host device using the selected profile.

Figure 4:
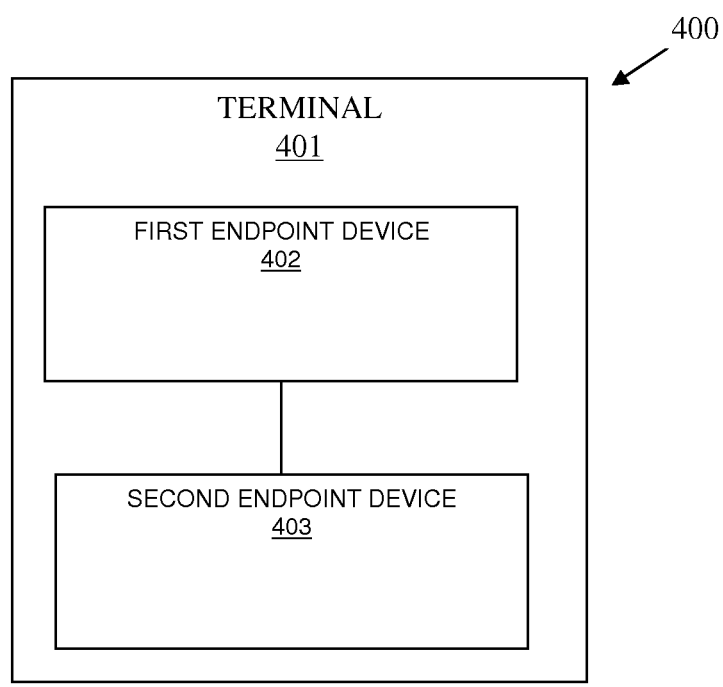
FIG. 4 is a diagram of a cryptographic security profile system, according to an example embodiment.

FIG. 4 is a diagram of a cryptographic security profile system 400, according to an example embodiment. Some components of the cryptographic security profile system 400 are implemented as executable instructions and programmed within a non-transitory computer-readable (processor-readable) storage medium that execute on one or more processors of a device; the processors are specifically configured to execute the components of the cryptographic security profile system 400. The cryptographic security profile system 400 is also operational over one or more networks; any such networks may be wired, wireless, or a combination of wired and wireless.

In an embodiment, the cryptographic security profile system 400 implements, inter alia, the processing depicted in the FIGS. 1A, 1B, and 1C.

In an embodiment, the cryptographic security profile system 400 implements, inter alia, the method 200 of the FIG. 2.

In an embodiment, the cryptographic security profile system 400 implements, inter alia, the method 300 of the FIG. 3.

The cryptographic security profile system 400 includes a terminal device 401, a first endpoint device 402, and a second endpoint device 403.

In an embodiment, the terminal 401 is one of: a POS device, an ATM, a SST, and a kiosk.

In an embodiment, the first endpoint device 402 is a SIOM that is integrated into and operates independent of the hardware and OS of the terminal 401. The SIOM 402 acts as a secure interface to the second endpoint device 402 that is peripheral device 403 and communicates with the peripheral device 403 through secure encrypted sessions within the terminal 401.

The first and second endpoint devices 402 and 403 are integrated within and into the terminal 401 and receive communications and send communications through secure sessions with one another.

In an embodiment, the second endpoint device 403 is one of: a MSR, a pin pad, an encrypted pin pad, a printer, a scanner, a keyboard, a value media dispenser, a display, and a touch screen display.

The first endpoint device 402 is adapted and configured to: request a secure session of the second endpoint device 403, select a security profile for the secure session (based on what the first endpoint device 402 supports and what the second endpoint device 403 is capable of supporting), and establishes the secure session with the second endpoint device 403.

The second endpoint device 403 is adapted and configured to: send a list of available security profiles to the first endpoint device 402 to select the selected security profile and sends an encrypted message using the selected security profile back to the first endpoint device 402 for the first endpoint device 402 to establish the secure session with the second endpoint device 403.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by a Secure Input/Output Module (SIOM) integrated into a terminal device as an independent hardware module, a security profile list from a requesting device, the SIOM is independent of an Operating System (OS) of the terminal device's and the SIOM acting as an interface for communications to and from peripheral devices integrated into the terminal device and the peripheral devices include: a Magnetic Strip Reader (MSR), a pin pad, an encrypted pin pad, a printer, a scanner, a keyboard, a value media dispenser, a display, and a touch screen display, and the terminal is one of: an Automated Teller Machine (ATM), a Self-Service Terminal (SST), and a kiosk;
selecting, by the SIOM, a security profile from the security profile list; and
establishing, by the SIOM, a secure communication session with the requesting device using the selected security profile for data encryption and authentication during the secure communication session by mapping numeric identifiers included in a name for the selected security profile to a specific group or grouping of encryption, a specific hashing, and a specific authentication and a size to use for one or more encryption keys used with a specific cryptographic algorithm that is processed for establishing the secure communication session.

2. The method of claim 1, wherein receiving further includes sending a message to the requesting device to solicit the requesting device to provide the security profile list.

3. The method of claim 1, wherein receiving further includes obtaining a requesting device identifier for the requesting device with the security profile list.

4. The method of claim 3, wherein obtaining further includes receiving authentication data for authenticating the requesting device with the requesting device identifier and the security profile list.

5. The method of claim 1, wherein selecting further includes identifying the selected security profile as a best available security profile capable of being supported by both the requesting device and the method.

6. The method of claim 5, wherein identifying further includes comparing the security profile list to an available list of security profiles accessible to the method to identify the best available security profile as the selected security profile, the best available security profile present in the available list of security profiles.

7. The method of claim 1, wherein establishing further includes notifying the requesting device of the selected security profile for use in the secure communication session and provide the requesting device a datagram of secure communication session specific information for the requesting device to establish the requesting device's side of the secure communication session.

8. The method of claim 7, wherein notifying further includes receiving a message from the requesting device encrypted using the selected security profile verifying the secure communication session has been established successfully between the method and the requesting device.

9. A method, comprising:
receiving, by a peripheral device integrated into a terminal device, a session connect message from a host device, wherein the host device is integrated into the terminal device as an independent hardware module that is independent of an Operating System (OS) of the terminal device and the host device acting as an interface for communications to and from the peripheral devices integrated into the terminal device and the peripheral devices include: a Magnetic Strip Reader (MSR), a pin pad, an encrypted pin pad, a printer, a scanner, a keyboard, a value media dispenser, a display, and a touch screen display, and wherein the terminal is one of: an Automated Teller Machine (ATM), a Self-Service Terminal (SST), and a kiosk;
providing, by the peripheral device, the host device with a list of security profiles available to the method;
obtaining, by the peripheral device, a selected security profile from the host device and available in the list of security profiles and mapping from numeric identifiers included in a name of the selected security a specific group or grouping of encryption, a specific hashing, and a specific authentication and a size to use for one or more encryption keys used with a specific cryptographic algorithm that is processed for establishing a secure communication session; and
sending, by the peripheral device, an announcement message to the host device requesting to begin establishing the secure communication session using the selected security profile.

10. The method of claim 9 further comprising, receiving a start secure session message from the host device in response to the sent announcement message including the selected profile to start a secure session with the host device.

11. The method of claim 10 further comprising, encrypting data sent to the host device during the secure session using the selected profile and decrypting other data received from the host device using the selected profile.

12. The method of claim 9, wherein providing further includes including an identifier for the device that executes the method with the list of security profiles.

13. The method of claim 12, wherein including further includes providing authentication data with the identifier and the list of security profiles for the host device to authenticate the device.

14. A system comprising:
a terminal device;
a first endpoint device integrated into the terminal device configured and adapted to: i) request a secure session of a second endpoint device; ii) select a security profile for the secure session based mapping numeric identifiers included in a name for the selected security profile to a specific group or grouping of encryption, a specific hashing, and a specific authentication and a size to use for one or more encryption keys used with a specific cryptographic algorithm that is processed for establishing the secure session, and iii) establish the secure session with the second endpoint device; and the second endpoint device integrated into the terminal device and configured and adapted to: i) send a list of available security profiles to the first endpoint device for the first endpoint device to select the selected security profile and ii) send an encrypted message using the selected security profile back to the first endpoint device for the first endpoint device to establish the secure session with the second endpoint device, wherein the first endpoint device is a Secure Input/Output Module (SIOM) that is an independent hardware module integrated into a terminal device and the SIOM is independent of the terminal device's Operating System (OS) and acts as an interface for communications to and from peripheral devices integrated into the terminal device, wherein the second endpoint device is a peripheral device that is one of: a Magnetic Strip Reader (MSR), a pin pad, an encrypted pin pad, a printer, a scanner, a keyboard, and a value media dispenser, and the terminal is a Point-Of-Sale (POS) device, an Automated Teller Machine (ATM), a Self-Service Terminal (SST), and a kiosk.

* * * * *